R. P. PARROTT.

Projectiles for Rifled Ordnance.

No. 6,027. Reissued Aug. 25, 1874.

Witnesses.
John Becker
Fred Haynes

R. P. Parrott
by his Attorneys
Brown & Allen

THE GRAPHIC CO. PHOTO-LITH. 39 & 41 PARK PLACE, N.Y.

UNITED STATES PATENT OFFICE.

ROBERT P. PARROTT, OF COLD SPRING, NEW YORK.

IMPROVEMENT IN PROJECTILES FOR RIFLED ORDNANCE.

Specification forming part of Letters Patent No. 33,100, dated August 20, 1861; reissue No. 6,027, dated August 25, 1874; application filed August 11, 1874.

*To all whom it may concern:*

Be it known that I, ROBERT P. PARROTT, of Cold Spring, in the county of Putnam and State of New York, have invented a new and useful Improvement in Projectiles for Rifled Ordnance; and I do hereby declare that the following is a full, clear, and exact description of the same, reference being had to the accompanying drawing forming part of this specification.

This invention relates to elongated projectiles, having attached to and arranged around the rear portions of their bodies a ring or cup of expanding metal, said ring or cup being secured to the body of the shot or shell by being embedded therein.

The invention consists in the construction of such an expansive attached ring or cup, with projections swaged, or otherwise formed on it before the insertion of the projectile in the gun, to provide for the entry of the sides or edges of the ring or cup within the grooves of the gun, in such a manner as to prevent windage, and to obtain a rotary motion of the projectile, and so that when loading, the projections on the ring or cup will only partially fill the grooves, so as not to interfere with the free loading of the gun, but so that said cup or ring will be driven completely into the grooves, and caused to fit the grooves and lands by the force of the explosion.

To enable others to fully understand my invention, I will proceed to describe the same with the expanding ring or cup arranged to extend in rear of the back end of the body of the projectile.

Figure 1:
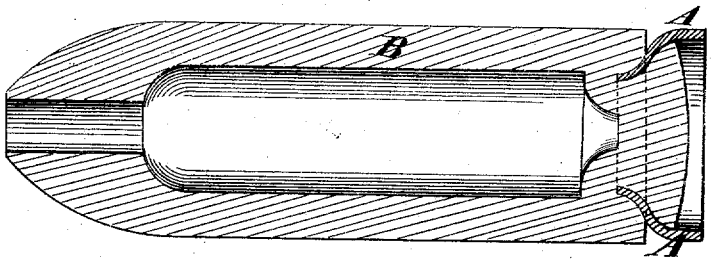
Figure 2:
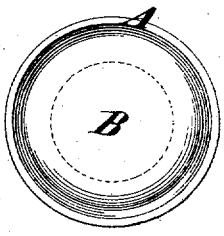
Figure 3:
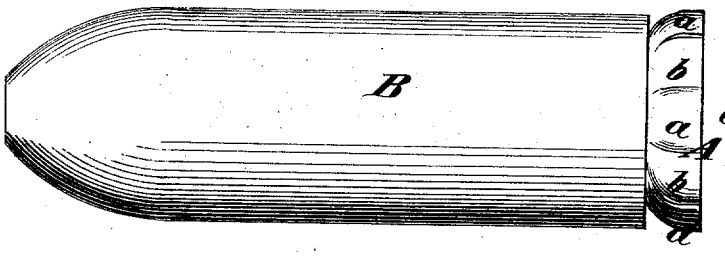
Figure 4:
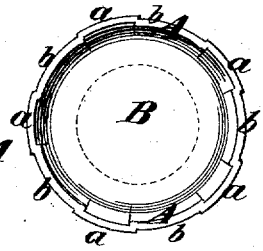

Figure 1 is a vertical longitudinal section of the projectile, in its condition before the swaging or forming of the cup to enter the grooves. Fig. 2 is a rear view of the same. Fig. 3 is a longitudinal outside view of the projectile in its finished condition, and Fig. 4 is a rear view of the same.

In the example represented in the accompanying drawing, A is the ring or cup of expanding metal. This ring or cup when first made, and before its attachment to the body of the projectile, is of perfect circular form, as shown in Fig. 2, and of no greater diameter than that which the body B of the projectile is to have when finished, as shown in Figs. 1 and 2. It is attached to the body B by placing it in the mold in which the body is to be cast, in such manner that after the casting it will be embedded in the metal of the body.

After the body has been turned, or otherwise made true, I place the projectile with the ring or cup upward or outward, in a cylinder of iron or steel of just sufficient caliber and depth to receive it, and, consequently, of a caliber a little less than that of the gun for which the projectile is intended, such cylinder being grooved similarly to the gun, except that its grooves are about one-twentieth of an inch less in width and depth than those of the gun.

When the projectile has been placed in this cylinder, with the edge of the ring or cup even with the mouth thereof, the ring or cup is driven outward into the several grooves thereof in such a manner as to fit them, by means of a hammer and a suitable tool, and when the projectile is removed from the said cylinder, the projections *a a*, (see Figs. 3 and 4,) formed on the ring or cup by driving the expanding metal of the latter into the grooves of the said cylinder, will pass so easily through the grooves of the gun, and the intervening portions *b b* of the exterior of the ring or cup will pass so easily along the lands thereof that no obstruction occurs in the loading of the gun.

When the gun is fired, the force of the explosion of the powder causes the expansion of the ring or cup in a lateral direction, in such a manner that its projections *a a* will fit closely into the grooves of the gun, and the intervening portions *b b* will fit snugly to the lands, and hence windage will be effectually prevented, and a rotary motion of the projectile insured.

Instead of forming the projections *a a* on the ring or cup by the means described, they may be formed in any suitable manner before or during the attachment of the ring or cup to the body of the projectile.

I do not confine myself to the use of any particular process of forming the projections on the expanding metal ring or cup.

I claim—

The expanding metal ring or cup applied to the rear portion of the body of the projectile, and formed before the insertion of the projectile into the gun, with projections ar-arranged to enter within the rifled grooves, substantially as specified.

ROBERT P. PARROTT.

Witnesses:

SEYMOUR B. NELSON,

HENRY JAYCOX.